Feb. 3, 1959 W. P. SHEPARD, JR 2,871,611
BAIT MISER
Filed Aug. 9, 1957
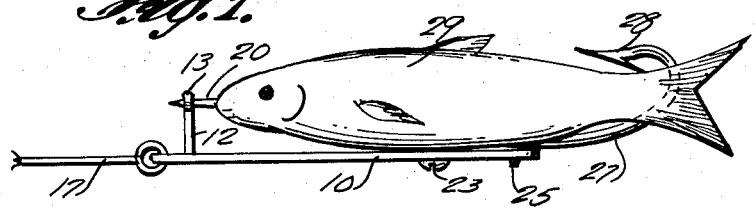
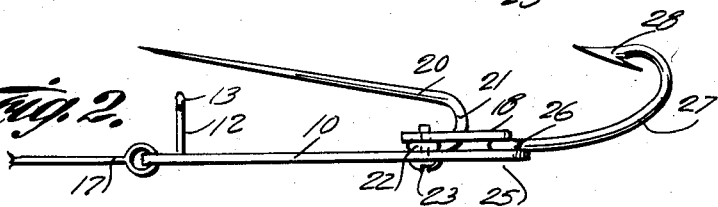
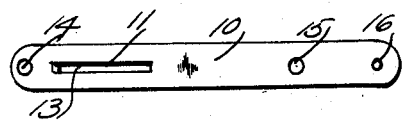
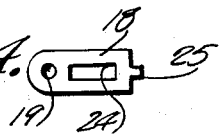 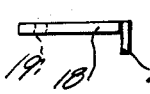
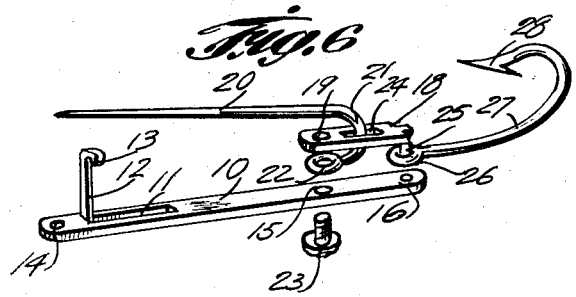
INVENTOR.
Walter P. Shepard, Jr.
BY Victor J. Evans & Co.
ATTORNEYS

United States Patent Office 2,871,611
Patented Feb. 3, 1959

2,871,611

BAIT MISER

Walter P. Shepard, Jr., Bradenton, Fla.

Application August 9, 1957, Serial No. 677,362

4 Claims. (Cl. 43—44.2)

This invention relates to a fishing accessory, and more particularly to a device for use in holding bait.

The object of the invention is to provide a device which is adapted to be used for holding bait whereby there will be less likelihood of the bait becoming lost.

Another object of the invention is to provide a bait holding device which is adapted to be connected to a fishing line, and wherein a fishhook is associated with the device in such a manner so that when the fish attempts to strike or remove the bait, the fishhook will be immediately engaged so that the fish will be caught whereby the fish can be efficiently and readily retrieved and wherein the device is adapted to be used in such a manner that the bait will not readily become disengaged from the holder so that a person using the device will only require a minimum amount of bait when fishing.

A further object of the invention is to provide a bait and fishhook holding device which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view showing the bait holding device of the present invention, and showing the bait thereon.

Figure 2 is a view similar to Figure 1, but showing the bait removed and the impaler disengaged from the hook.

Figure 3 is a plan view illustrating the bar.

Figure 4 is a plan view of the plate which is part of the device.

Figure 5 is a side elevational view of the plate of Figure 4.

Figure 6 is a perspective view of the bait holding device of the present invention, showing the parts separated or disassembled.

Referring in detail to the drawings, the fishing accessory of the present invention includes an elongated bar which is indicated generally by the numeral 10, and the bar 10 includes an upstanding finger 12 which is struck-out from the bar as at 11, and a hook 13 is formed or arranged on the upper end of the finger 12 for a purpose to be later described.

The bar 10 is provided with a first, second and third opening which openings are indicated by the numerals 14, 15 and 16, Figure 3. The numeral 17 indicates a portion of a fishing line which is adapted to be connected to the opening 14 in the front of the bar 10.

There is further provided a plate 18 which is provided with a threaded aperture 19 which is arranged in registry above the second opening 15. The numeral 20 indicates an impaler or prong which is mounted for movement into and out of engagement with the hook 13, and the impaler 20 includes a curved portion 21 which terminates in an eyelet 22, and the eyelet 22 registers with the aperture 19 in the opening 15. A suitable securing element such as a bolt or screw member 23 extends through the opening 15, through the eyelet 22, and into threaded engagement with the aperture 19.

The plate 18 is further provided with a cut-out or slot 24, Figure 4, for the projection therethrough of a portion of the impaler 20. Extending downwardly from the plate 18 and secured thereto or formed integral therewith is a pin 25 which is adapted to extend through an eyelet 26 which is arranged on a fishhook 27, and the fishhook 27 includes a barb 28. The pin 25 which extends through the eyelet 26 also extends through the opening 16 in the rear of the bar 10. The numeral 29 indicates the bait which is impaled on the member 20 and with the bait 29 on the member 20, it will be seen that a portion of the member 20 adjacent the front end thereof is engaged by the hook 13 whereby the parts are retained in the position shown in Figure 1. When the bait 29 is being placed on the member 20, the parts are in the position shown in Figure 2 so that the bait can be readily inserted on the member 20, and then the member 20 can be arranged in engagement with the hook 13 so as to prevent accidental loss of the bait 29 from the impaler 20.

From the foregoing, it is apparent that there has been provided a fishing accessory which is in the nature of a device for holding bait such as the bait 29 and wherein when a fish attempts to take the bait 29, the hook 27 is arranged so that the barb 28 will automatically engage the fish whereby when the line 17 is pulled in, the fish can be readily retrieved. Since the bait 29 is impaled on the member 20, and since the member 20 is held in the position shown in Figure 1 by means of the hook 13 on the upper end of the finger 12, it will be seen that the bait 29 will not readily come loose from the impaler 20 so that a single piece of bait 29 will last an extremely long time. The hook 27 is arranged so that its eyelet 26 is above the opening 16 in the bar 10, and the pin 25 which depends from the plate 18, extends through the eyelet 26 and through the opening 16 so as to maintain the hook 27 in its proper position as shown in Figures 1 and 2. Also, when the fish attempts to take the bait 29, the barb 28 is arranged in such a manner that the barb 28 will immediately engage the fish and the fish will be caught before the bait 29 is swallowed or removed by the fish. In the event that the hook 27 becomes rusty or bent or otherwise worn out, then the screw member 23 can be readily unscrewed from the aperture 19 whereby the plate 18 can be disengaged from the bar 10 and this permits the hook 27 to be removed whereby a new hook 27 can be inserted in the device. Thus, when the hook such as the hook 27 becomes worn, it is not necessary to replace the entire device, since it is only necessary to insert or position a new fishhook therein.

As previously stated, the hook 27 is detachably connected in place and the hook 27 is not soldered or welded in place so that the present invention can be readily stamped out with one operation and with a minimum of labor so that the device can be easily and quickly assembled whereby the cost of manufacturing the device is extremely low. It is well known that fishhooks have a tendency to rust when used in salt water and fishhooks often get damaged when they strike rocks or other objects in use. When this happens with a device which uses a rigid hook thereon, the entire unit becomes useless, but with the present invention in the event that a hook such as the fishhook 27 gets rusty or damaged, it is only necessary to replace the hook so that the unit can be used over and over again, and the parts of the device of the present invention are adapted to be made of rustproof material. The device herein described permits the fisherman to readily change the size or style of the hook to meet his individual need since the hook can be changed in a very short period of time. The parts can be made of any suitable material and any desired shape or size can be utilized. The finger 12 and hook 13 are adapted to be pressed out of or stamped out of the bar 10 as previously described. The impaler 20 may be made of steel wire, and a portion of the impaler 20 passes through the slot 24 in the plate 18. As specific examples of the material that can be used for making the present invention, the following is given. Aluminum, brass, nickel, suitable alloys, or stainless steel, and the device may range in size from 1½" for fresh water fish to 10" or longer for deep sea fishing.

The device is adapted to put the fishhook at the end of the bait whereby the fish will be forced to swallow the hook before it can reach the bait. The device prevents the fish from stripping the bait off the hook without getting caught so that a greater number of fish will be caught and wherein less bait will be lost. Also, the bait has a more natural look when going through the water so as to be more enticing for the fish to strike. The device can be used with any type of live bait, cut bait or artificial bait such as rubber or plastic bait. Also, the device of the present invention is adapted to give the fisherman any type of fishhook he requires or desires such as a single, double or triple hook and wherein the fishhook can be easily and quickly changed.

What is claimed is:

1. In a fishing accessory, an elongated bar provided with a first opening in its front end for connection to a fishing line, a finger extending upwardly from the front portion of said bar and having a hook on the upper end thereof, there being spaced apart second and third openings in the rear portion of said bar, a plate spaced above the rear portion of said bar and said plate being provided with a threaded aperture registering with the second opening in said bar, an impaler adapted to extend through bait and engage said hook, said impaler including a curved portion terminating in an eyelet interposed between said plate and bar, said eyelet registering with the aperture in said plate and with said second opening, a screw member extending through said second opening and through said eyelet and threadedly engaging said aperture, a fishhook including a rearwardly disposed barb and a forwardly positioned eyelet arranged above the third opening in said bar, and a pin depending from the rear end of said plate and projecting through said last named eyelet and through said third opening, there being a cut-out in said plate for the projection therethrough of a portion of said impaler.

2. In a device of the character described, a bar adapted to be connected to a fishing line, an impaler connected to said bar for engagement with bait, a fishhook detachably connected to the rear of said bar, and a plate having a slot therein through which said impaler extends engaging said fishhook to retain said fishhook in rigid relation to said bar.

3. In a device of the character described, a bar adapted to be connected to a fishing line, an impaler connected to said bar for engagement with bait, a fishhook having an eye on one end thereof, a plate having a pin on one end thereof for engaging the eye on said fishhook for detachably connecting said hook to the rear of said bar, and a finger extending upwardly from said bar and having a hook on its upper end for engagement with said impaler.

4. In a device of the character described, a bar adapted to be connected to a fishing line, an impaler connected to said bar for engagement with bait, a fishhook having an eye on one end, a plate having a centrally located slot therein through which said impaler extends and a pin on one end thereof for engaging the eye on said fishhook for detachably connecting said fishhook to the rear of said bar, a finger extending upwardly from said bar and having a hook on its upper end for engagement with said impaler, and a screw member engaging the opposite end of said plate for maintaining said impaler and fishhook connected to said bar.

References Cited in the file of this patent
UNITED STATES PATENTS

| | | |
|---|---|---|
| 123,844 | Sinclair | Feb. 20, 1872 |
| 1,246,150 | Parr | Nov. 13, 1917 |
| 2,700,240 | Gibbs | Jan. 25, 1955 |